United States Patent
Tariq et al.

(10) Patent No.: US 11,232,102 B2
(45) Date of Patent: Jan. 25, 2022

(54) BACKGROUND PROCESSING TO PROVIDE AUTOMATED DATABASE QUERY TUNING

(71) Applicant: salesforce.com, inc., San Francisco, CA (US)

(72) Inventors: Awais Tariq, Brentwood, CA (US); Rohitashva Mathur, Walnut Creek, CA (US); Arup Dutta, San Ramon, CA (US); Prem Veeramani, Hayward, CA (US); Jesse Collins, Oakland, CA (US)

(73) Assignee: salesforce.com, Inc., San Francisco, CA (US)

(*) Notice: Subject to any disclaimer, the term of this patent is extended or adjusted under 35 U.S.C. 154(b) by 17 days.

(21) Appl. No.: 15/295,319

(22) Filed: Oct. 17, 2016

(65) Prior Publication Data

US 2018/0107711 A1 Apr. 19, 2018

(51) Int. Cl.
*G06F 16/2453* (2019.01)
*G06F 16/21* (2019.01)

(52) U.S. Cl.
CPC ...... *G06F 16/24534* (2019.01); *G06F 16/217* (2019.01)

(58) Field of Classification Search
CPC ......... G06F 17/30306; G06F 17/30442; G06F 17/30448; G06F 16/217; G06F 16/2453; G06F 16/24534
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |

(Continued)

*Primary Examiner* — Kannan Shanmugasundaram
(74) *Attorney, Agent, or Firm* — Kwan & Olynick LLP (57) ABSTRACT

A database query is received at a first time when a database is in a first state. The database query is analyzed to determine whether it has one or more characteristics that fall within a historical top range of database queries. If the database query falls within the historical top range of database queries the query is stored for later query tuning activity. The query is executed against the database in the first state. Query tuning recommendations are generated for stored database queries that fall within the historical top range of database queries. A subsequent request is received at a second time when a database is in a second state. The subsequent database query is executed with at least one of the query tuning recommendations against the database in the second state.

20 Claims, 7 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,127,456 B1* | 10/2006 | Brown ................. G06F 16/217 707/999.005 |
| 7,289,976 B2 | 10/2007 | Kihneman et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0119999 A1* | 6/2005 | Zait .................. G06F 17/30306 707/999.003 |
| 2008/0263009 A1* | 10/2008 | Buettner ........... G06F 16/90335 707/999.003 |
| 2009/0024563 A1* | 1/2009 | Sengar ................ G06F 11/3409 707/999.002 |
| 2009/0077016 A1* | 3/2009 | Belknap ............ G06F 17/30306 707/999.002 |
| 2009/0177744 A1 | 7/2009 | Marlow et al. |
| 2010/0306228 A1* | 12/2010 | Carpenter ............. G06Q 30/02 707/765 |

* cited by examiner

Indexes

| Used | Description | Table | Fields | Cardinality | Table Size | Threshold Selectivity | Index Type | |
|---|---|---|---|---|---|---|---|---|
| ☑ | Composite index join | Clicktools Survey Results c | | 77274 | 630806.0 | 0.408332144385789 | | |
| ☐ | CustomIndexSelectiveFilter | Clicktools Survey Results c | COMPLETIONTIME c, PS Overall c | 77273 | 630806.0 | 1.22498058052345 | Potential | Create Index |
| ☐ | CustomIndexSelectiveFilter | Clicktools Survey Results c | Omit Survey c, COMPLETIONTIME c | 80427 | 630806.0 | 1.27497978789175 | Potential | Create Index |
| ☐ | ScanSelectiveFilter on table x | Clicktools Survey Results c | | 4810 | 630806.0 | 0.68318246910057 | Active | |
| ☐ | CustomIndexSelectiveFilter | Clicktools Survey Results c | COMPLETIONTIME c, PS Overall c | 77273 | 630806.0 | 1.22498058052345 | Potential | |
| ☐ | CustomIndexSelectiveFilter | Clicktools Survey Results c | Omit Survey c, COMPLETIONTIME c | 80427 | 630806.0 | 1.27497978789175 | Potential | |
| ☐ | CustomIndexSelectiveFilter | Clicktools Survey Results c | Omit Survey c, PS Overall c | 414754 | 630806.0 | 6.57494332683375 | Potential | |
| ☐ | sparse join condition from x to fks | Clicktools Survey Results c | | 468443 | 630806.0 | 7.42605538910289 | Active | |
| ☐ | SkinnyScanSelectiveFilter on table fks | Case | | 332736 | 1.2326669E7 | 8.07260034879314 | Active | |
| ☐ | SkinnyScanSelectiveFilter on table fka | Account | | 2511792 | 2511792.0 | 158.76200407707836 | Active | |
| ☐ | SkinnyScanSelectiveFilter on table fkc | Contact | | 20195042 | 2.0195042E7 | 211.49570171133092 | Active | |

| Timestamp | Organization Id | User Id | Sql Id | Elapsed Time (in ms) | Recommended Index | Query Type | Primary Entity |
|---|---|---|---|---|---|---|---|
| | | | | Query Type [All ◇] | | | |
| | | | | User ID [ ] | | | |
| | | | | Start Time (GMT) [04/23/2016 05:35 PM] [04/26/2016 12:36 AM] | [Submit] | | |
| | | | | Primary Entity [ ] | | | |
| 2016-04-25 12:31:02.559 | 00030000000mnRR | 0053000004RI4a | gv66s8av2h925 | 60432 | Not Supported | Soql | ReportInstance |
| 2016-04-25 12:31:02.600 | 00030000000mnRR | 0053000004RI4a | gv66s8av2h925 | 60731 | Not Supported | Soql | ReportInstance |
| 2016-04-25 08:52:01.835 | 00000000000062 | 005300000009MYYQ | 8ttq21mh82bdm | 60773 | Not Supported | Soql | 0I130000002ItUe |
| 2016-04-25 12:45:07.924 | 00000000000062 | 005300000000BzSKN | bx8z03cazqx5r | 60825 | | Report | |
| 2016-04-25 01:01:06.449 | 00000000000kZqF | 005300000000Anyzq | 8nmau21cvvc8r | 60854 | | Soql | DandBCompany |
| 2016-04-25 17:43:01.797 | 00000000000062 | 005300000009MyXT | 6vq5sh7ks7qf9 | 61747 | Case IsClosed... | Report | |
| 2016-04-25 13:21:10.917 | 00000000000062 | 005300000000ASCfM | bx8z03cazqx5r | 61923 | 0I130000001Cmra 00N30000005sz34... | | |
| 2016-04-25 07:21:29.142 | 00000000000062 | 005300000009MyXT | 9frjf2jm9wujy | 62197 | | Report | |
| 2016-04-25 18:18:24.382 | 00030000000n0gj | 0053000004hFbR | cny4bkru0j4qt | 62534 | Account Industry... | Report | |
| 2016-04-24 16:33:00.366 | 00030000001HrL6 | 0053000007E9yp | ccn6064thsfk4 | 62804 | | Soql | Case |
| 2016-04-23 19:03:15.619 | 00030000001H88T | 005300000AHaB3 | 11fyp3hxjcst8 | 63155 | Case isClosed... | Report | |
| 2016-04-25 10:05:37.579 | 00000000000062 | 005300000009j49R | 0m2pfpgghfqgr | 63167 | | | |
| 2016-04-25 19:31:54.774 | 00000000000062 | 005300000000borQ | c66f3tjkpcvz7 | 63412 | | Soql | OrderItem |

CustomIndex 0I130000001Cmra
NullsIncluded=false
BooleanValueIndexed(If applicable)=false
Field 1 : 00N30000005sz34

FIG. 4

Org ID [                    ]
End Time (GMT) [ 04/26/2016 12:35 AM ] [ 04/26/2016 12:36 AM ]
Request Id [                    ]

| Query Id | Sql Text | Sql Text | Request URI | Request Id | Source | HBase Id |
|---|---|---|---|---|---|---|
| 5914be931b694a3d73c40db86303480c | SELECT Id, ReportId, ReportIn... | select /* SQL */ from (selec... | /aura | 43XOztCCoMc3gymlpup47- | Primary | 0GU3x000000BqCg |
| 6d54c9d5a39935c630c23ff2e0f1f6da9 | SELECT Id, ReportId, ReportIn... | select /* SQL */ from (selec... | /aura | 43XOzs91qIAA7imlpuitJ- | Primary | 0GU3x000000Bta2 |
| 76148cee5c98284d32f1c3e387e1e22 | SELECT ID, Apttus_Config2_Qu... | select /* Apex.()* */ from (se... | /apexremote | 43XD1vnzwMSLeTmlput5w- | Primary | 0GU3x000000Brl6 |
| 00O0M000008hnbl | | select /* 07030000004K3R 0000... | /mockRequest/00O0M000008hnbl/... | 43XPkAkecq-LzimIpurdw- | Primary | 0GU3x000000COFe |
| 0d0df669372b1453d7843ab300d8ab91 | select id from DandBCompany Co... | select /* ApexBatch.(System Co... | /mockRequest/BatchApexJob/00D... | 43WoLHvBBY4D_imIpusyy- | Primary | 0GU3x000000BsWg |
| 00O30000008KoXR | | select /* rptcaselist 00O30000... | /mockRequest/00O30000008KoXR/... | 43XeZRL_3e2inDmIpuqwk- | Primary | 0GU3x000000Bt5J |
| 00O0M000008hnbl | | select /* 07030000004K3R 0000... | /mockRequest/00O0M000008hnbl/... | 43XRdz46hPnHCDmIpusl9- | Primary | 0GU3x000000COVw |
| 00O30000008L3aQ | | select /* 07030000004JNt 0003... | /mockRequest/00O30000008L3aQ/... | 43X7y_2-CtKgPymIpurdw- | Primary | 0GU3x000000BpfO |
| 00O30000008TkOU | | select /* 070300000Gq74 0003... | /00O30000008TkOU | 43XgwtNngRn9hTmIpussw- | Primary | 0GU3x000000BuNv |
| 00O30000008APLO | | select /* rptacctlist 00O30000... | /mockRequest/00O30000008APLO/... | 43WN_Hg2-oPtFymIpuitJ- | Primary | 0GU3x000000Bt24 |
| 72c1da685de5cb9ee56ff64f9039e56d | SELECT Employee_Manager_stati... | select /* SQL */ "Id" from (se... | /services/Soap/u/29.0/00D3000... | 43VHEFXtIB8XqimIpurzy- | Primary | 0GU3x000000Bsm3 |
| 00O30000008zmck | | select /* rptcaselist 00O30000... | /mockRequest/00O30000008zmck/... | | | |
| 81880c6ca121b0c02bc5b424195508c | SELECT OrderItem.EndDate, Ord... | select /* Apex.(System Code)* /... | | 43XGyQG3GlGhkNnRp0sVR- | Primary | 0GU3x000000Bqk3 |

BACKGROUND PROCESSING TO PROVIDE AUTOMATED DATABASE QUERY TUNING

TECHNICAL FIELD

Embodiments relate to database management. More particularly, embodiments relate to techniques for efficiently tuning database queries.

BACKGROUND

Traditional database query tuning techniques include, for example, use of statistics to determine a most efficient path and/or use of optimized indexes. Other techniques can also but utilized. However, current techniques can only provide partial improvement. More efficient query optimization is desirable to provide a more efficient database environment.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

As described in greater detail below, some percentage/number of top database queries (e.g., Structured Query Language (SQL) queries) can be identified. For the top queries, details are captured and can be stored for later analysis. Analysis can take various forms, some of which are described in detail below. The results of the analysis can provide recommended actions/improvements for future execution of the corresponding query/queries. For example, one or more query tuning steps can be suggested, which can include, for example, custom indexes and/or selective filtering.

In one embodiment, recommendations are scored by estimated savings in query time and selections are made accordingly. In one embodiment, top recommended custom indexes are created based on job limits. In one embodiment, statistics can be analyzed to determine the queries for which details are to be captured. For example, using an ORACLE® database the Automatic Workload Repository (AWR) can provide performance metrics to be evaluated for one or more queries. In one embodiment, performance metrics are gathered periodically.

In one embodiment, at the end of each pre-selected time period (e.g., hourly, daily, every 25 minutes), a repository of query statistics can be queried to determine one or more top queries (e.g., top 20, top 10, top 5%, top 1%) corresponding to one or more parameters (e.g., buffer gets, processor consumption, disk reads, elapsed time). For these top queries, one or more query tuning recommendations can be generated.

In one embodiment, queries are executed as received (or automatically tuned) and the generation of query tuning recommendations occurs independently, for example, as one or more background jobs. In this embodiment, query execution is not stalled or postponed pending generation of tuning query recommendations. If a query is received again, for example, to be executed against updated or different data, one or more recommended tuning steps can be taken to provide more efficient execution of subsequent queries.

Figure 1:
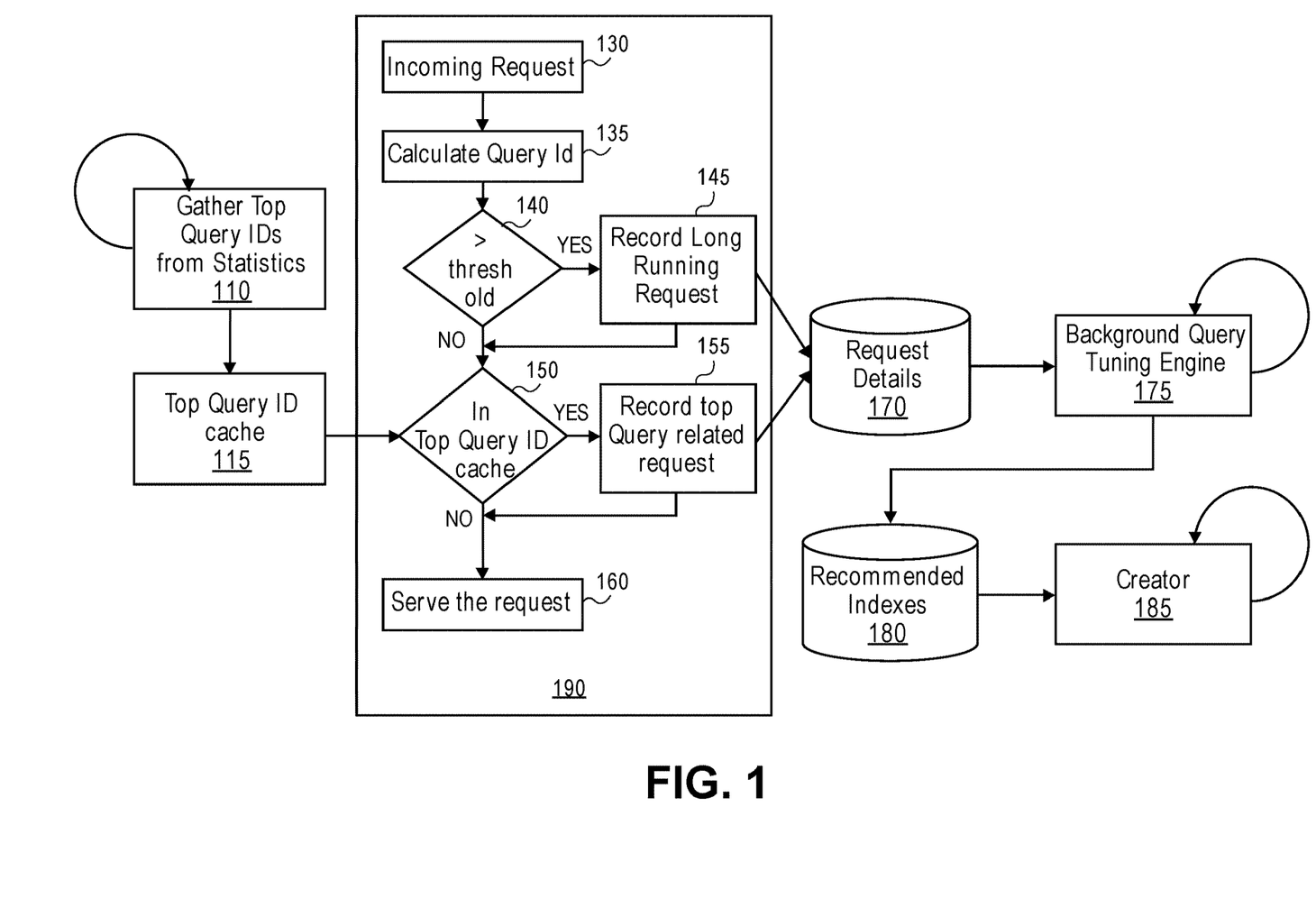
FIG. 1 is a flow diagram of one embodiment of a technique to provide query tuning recommendations with background processes.

FIG. 1 is a flow diagram of one embodiment of a technique to provide query tuning recommendations with background processes. The operations described with respect to FIG. 1 can be performed by one or more agents 190 within a database environment, which can be, for example an on-demand services environment. Various embodiments of on-demand service environments are described in detail below.

Query identifiers (query IDs) for some number of top queries can be determined, 110. In one embodiment, a query tuning agent (or other system agent/entity) can analyze/query/retrieve query IDs for top queries in one or more different categories. These categories can include, for example, buffer gets, processor consumption, disk reads, elapsed time, estimated query time, number of times the query is to be run and/or other characteristics. In one embodiment, a top number (e.g., top 10, top 20, top 5%) of query IDs for each selected category can be gathered. In an alternative embodiment, some combination of these characteristics (e.g., a weighted average) can be utilized to gather query IDs.

The gathered query IDs can be stored in, for example, a top query ID cache, 115. In one embodiment, the gathering (110) and storing (115) are performed periodically, for example, hourly, daily, five times a day, every 30 minutes. In an alternate embodiment, the gathering (110) and storing (115) are performed continually with continuous updates to the query ID cache. Similarly, contents of the query ID cache can be processed periodically by background processes described in greater detail below.

Incoming requests are received, 130. These requests can be any type of resource request to the host environment. In one embodiment, the request includes at least one database query (or results in the generation of at least one database query). In one embodiment, the database query includes at least one SQL statement; however, other languages/formats can be supported. A query ID is generated for the request, 135.

If the execution time corresponding to query ID exceeds a pre-selected threshold, 140, the query is recorded as a long running request, 145. For each long running request identified (140 & 145), request details are stored, 170. If the query ID does not exceed the pre-selected threshold, 140, the system checks the top query ID cache, 150.

If the query ID is found in the top query ID cache, 150, the request is recorded as a top query related request, 155. For each top query ID identified (150 & 155), request details are stored, 170. In one embodiment, a top query IDs corresponds to a query that is in a top percentile/number in one or more different categories. These categories can include, for example, buffer gets, processor consumption, disk reads, elapsed time, estimated query time, number of times the query is to be run and/or other characteristics. In one embodiment, a top percentage/number (e.g., top 10, top 20, top 5%) of query IDs for each selected category can be gathered. In an alternative embodiment, some combination of these characteristics (e.g., a weighted average) can be utilized to gather query IDs. The request can then be served, 160.

Request details 170 can be used by background query tuning engine 175 to generate recommended indexes, which can be stored in recommended index database 180. In one embodiment, background query tuning engine 175 operates in the background with respect to database operations. In one embodiment, creator 185 operates to query tuning recommendations based on the indexes. As described in greater detail below, background query tuning engine can operate in the background, for example, batch jobs during low load conditions (e.g., non-business hours) to generate query tuning recommendations. The query tuning recommendations can be presented to a user, for example, via a graphical user interface, or applied automatically.

Figure 2:
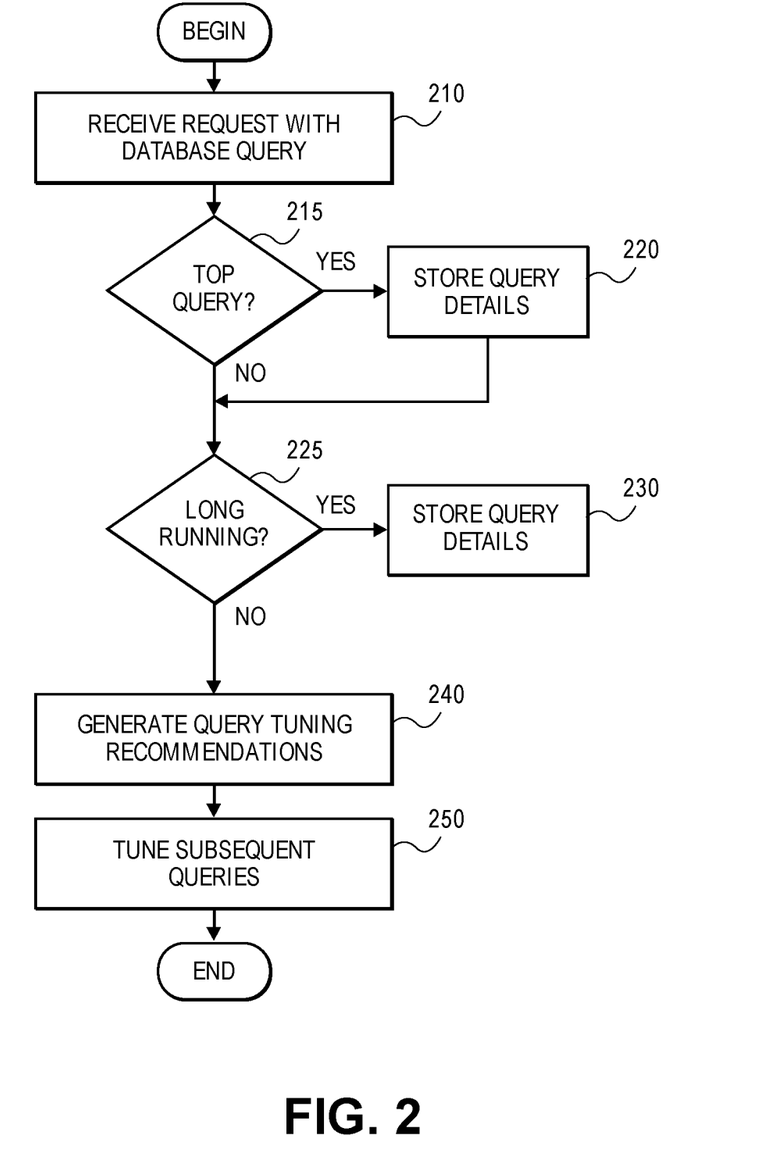
FIG. 2 is a flow diagram of one embodiment of a technique for background processing to provide query tuning recommendations.

FIG. 2 is a flow diagram of one embodiment of a technique for background processing to provide query tuning recommendations. In one embodiment, the operations of FIG. 2 are provided within an on-demand services environment having one or more multitenant databases, embodiments of which are described in greater detail below. In other embodiments, the operations of FIG. 2 can be provided in different computing environments having one or more databases.

A request having at least one database query is received, 210. The database query can be, for example, a Structured Query Language (SQL) query, or other type of database query. If the query is identified as a top query, 215, query details are stored, 220. In one embodiment, a top query is a query that is in a top percentile/number in one or more different categories. These categories can include, for example, buffer gets, processor consumption, disk reads, elapsed time, estimated query time, number of times the query is to be run and/or other characteristics. In one embodiment, a top percentage/number (e.g., top 10, top 20, top 5%) of queries for each selected category can be gathered identified as top queries. In an alternative embodiment, some combination of these characteristics (e.g., a weighted average) can be utilized to determine to queries.

If the query is not a top query, 215, the system determines if it is a long running query, 225. If the query is a long running query, 225, query details are stored, 230. A long running query can be a query having an execution time that exceeds some pre-selected threshold. A long running query can also be a query having an execution time that exceeds some other execution metric, for example, twice the average execution time, 50% greater than an estimated execution time, etc.

Query tuning recommendations are generated, 240. In one embodiment, the query tuning recommendations are generated by a background process. That is, the first time that the query is received, it is executed normally and tuning recommendations can be generated if the query is a top query or a long running query. The tuning recommendations can be suggested or automatically applied for subsequent executions of the query, 250.

Figure 3:
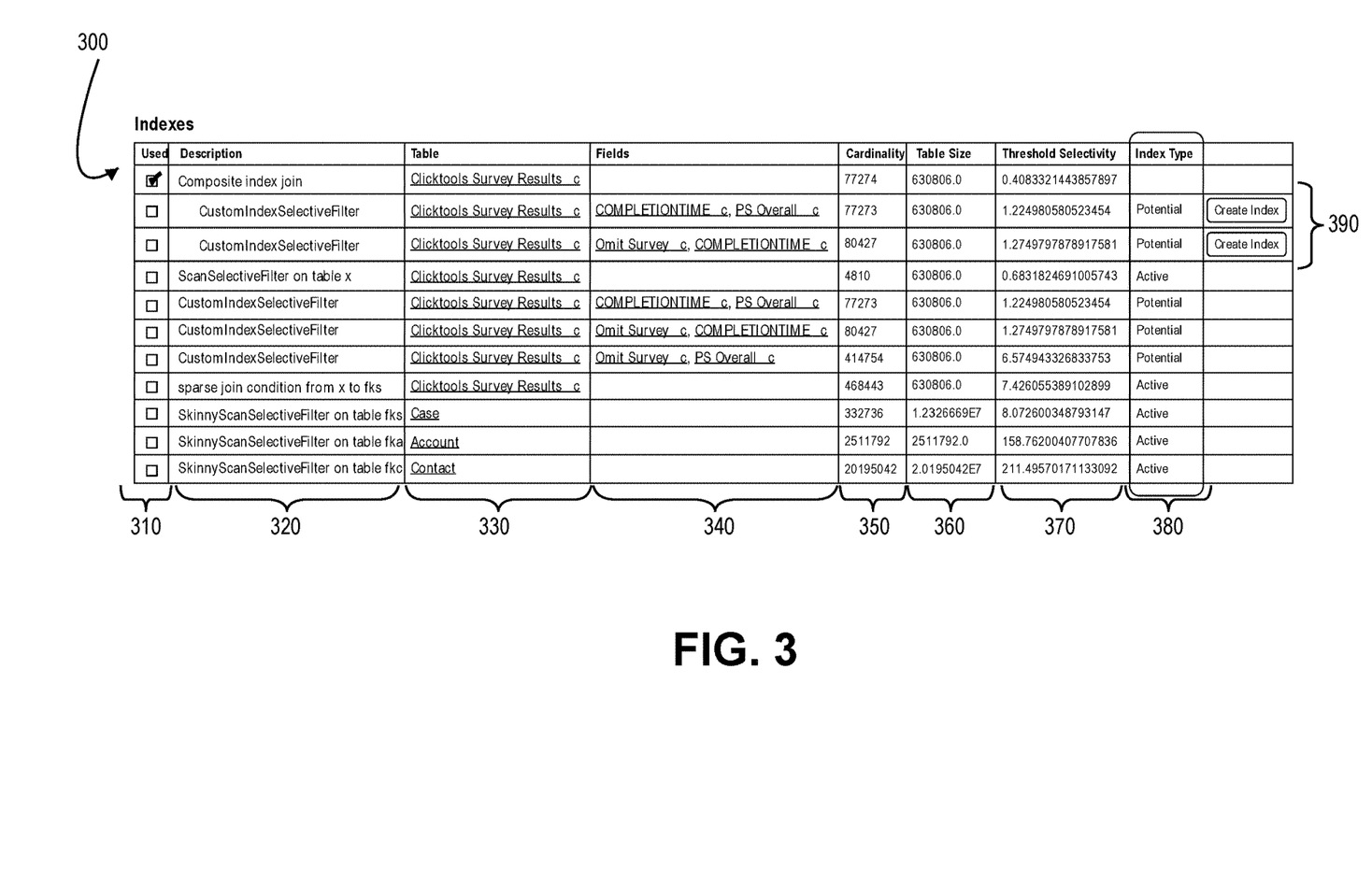
FIG. 3 is an example graphical user interface in which query tuning recommendations for top queries can be presented.

FIG. 3 is an example graphical user interface in which query tuning recommendations for top queries can be presented. In one embodiment, the query tuning recommendations can be presented, for example, in association with a query plan interface or other mechanism for creating or initiating query plans. In one embodiment, the interface of FIG. 3 can be utilized with top database queries as identified in the manner described with respect to FIG. 1.

In one embodiment, query tuning interface 300 can include one or more of the graphical elements described with respect to FIG. 3 to allow a user (or other entity) to select recommended options that can improve query performance. In one embodiment, checkboxes 310 are provided for each recommendation to allow a user a simple (e.g., 1-click) option for query tuning. In one embodiment, interface 300 includes description 320 for each or the query tuning recommendations presented to via interface 300.

In one embodiment, interface 300 can also provide tables 330 to which the various recommendations apply. In one embodiment, interface 300 can also provide fields 340 to which the various recommendations apply. This can allow the user some insight into which aspects of the query are being tuned with the corresponding recommendation.

In one embodiment, interface 300 provides cardinality 350 and table size 360 for the tables to which the recommendation corresponds. In one embodiment, interface 300 further provides threshold selectivity 370 for the tables to which the recommendation corresponds. In one embodiment, interface 300 can provide index type 380, which can indicate whether the corresponding custom index is active or potential. This can provide a user with the status of the custom index. In one embodiment, create index buttons 390 (or other interface elements) can allow a user to cause creation of the corresponding custom index.

Figure 4:
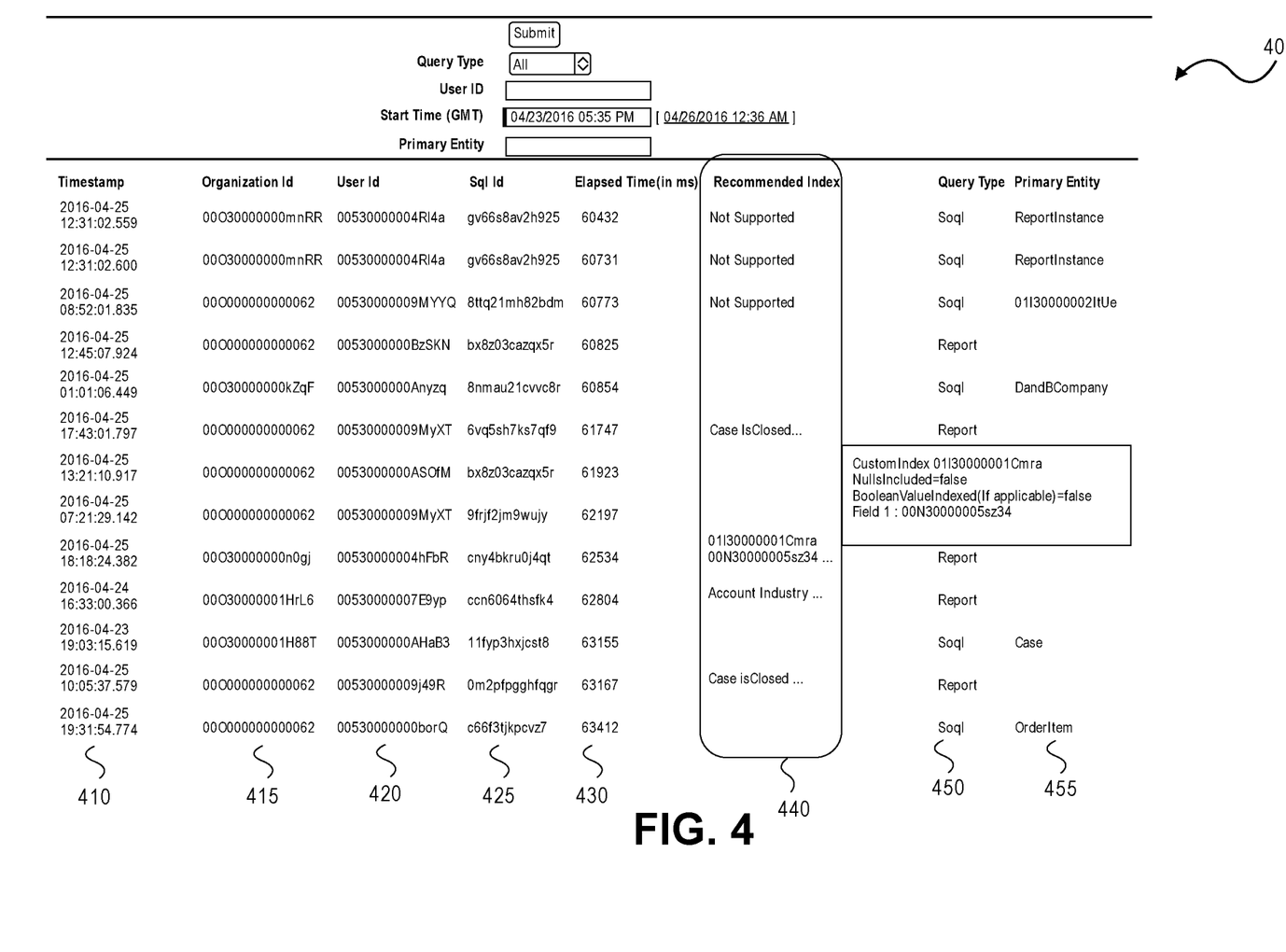
FIG. 4 is an example graphical user interface in which query tuning recommendations for long running queries can be presented.

FIG. 4 is an example graphical user interface in which query tuning recommendations for long running queries can be presented. In one embodiment, the query tuning recommendations can be presented, for example, in association with a query plan interface or other mechanism for creating or initiating query plans. In one embodiment, the interface of FIG. 4 can be utilized with long running queries as identified in the manner described with respect to FIG. 1.

In one embodiment, a timestamp (410), an organization ID (415), a user ID (420), a query statement ID (425) and an elapsed time (430) is provided for each long running query. In one embodiment, a recommended index (440) can be provided for one or more of the long running queries.

In one embodiment, additional information can be provided via interface 400. For example, a query type (450) and/or a primary entity (455). Further, a query ID (460) can be provided. In one embodiment, some or all of the query statement text (465, 470) can be provided. In one embodiment, the request URI (475) and/or the request ID (480) can be provided.

Figure 5:
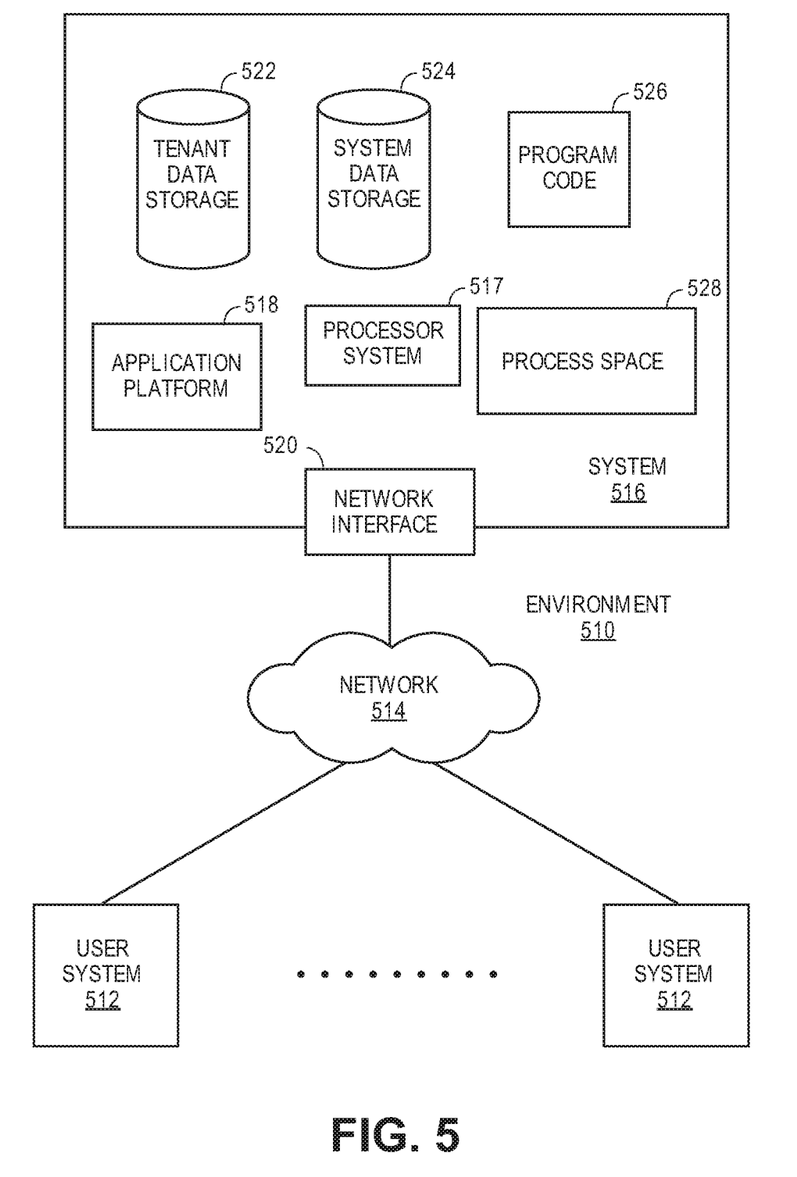
FIG. 5 illustrates a block diagram of an environment where an on-demand database service might be used.

FIG. 5 illustrates a block diagram of an environment 510 wherein an on-demand database service might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in herein FIG. 5 (and in more detail in FIG. 6) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
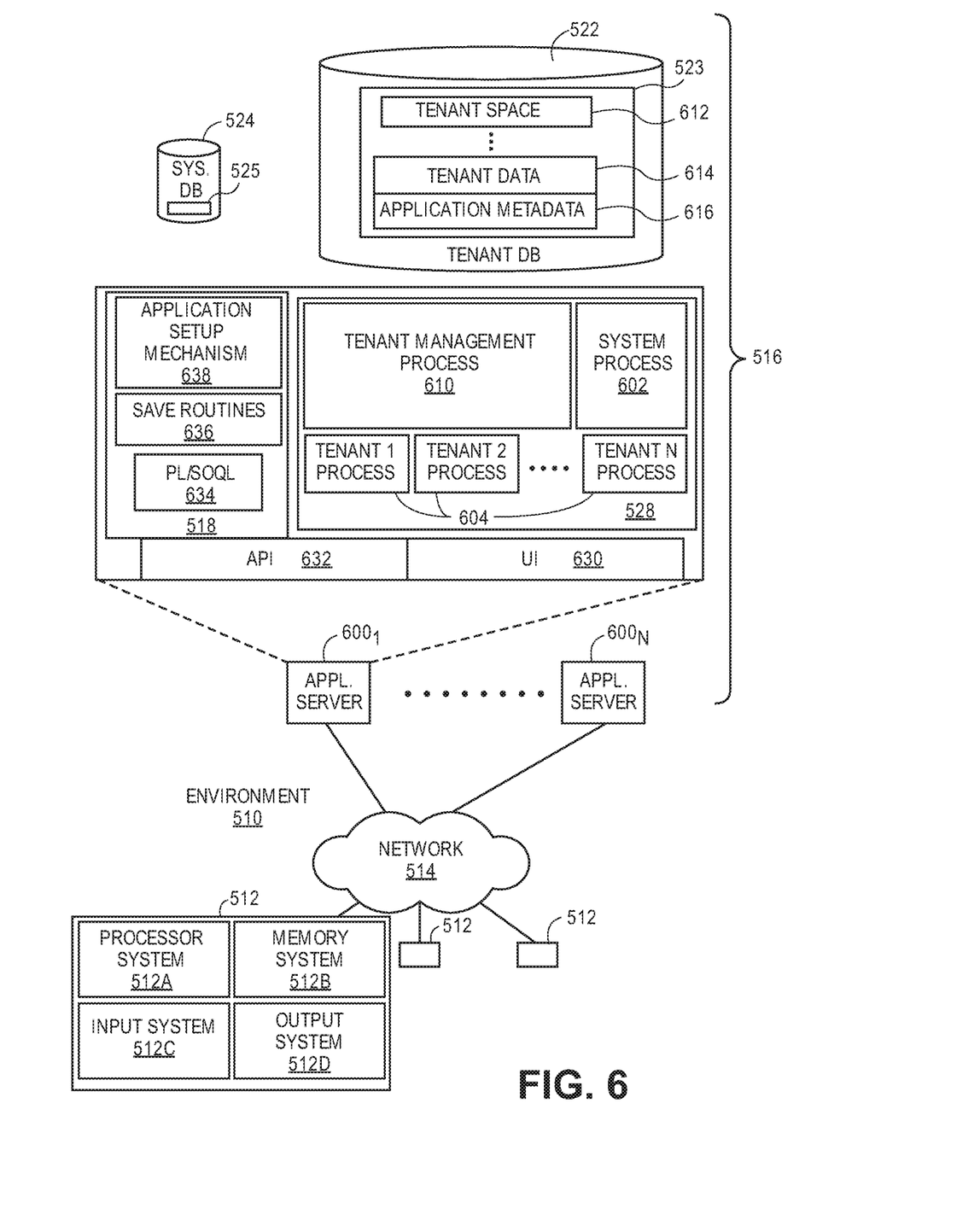
FIG. 6 illustrates a block diagram of an environment where an on-demand database service might be used.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$400_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service" issued Jun. 1, 2010 to Craig Weissman, which is incorporated in its entirety herein for all purposes. Invocations to applications may be detected by one or more system processes, which manage retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    receiving, with a computing platform having one or more processors coupled with at least one physical memory device, a request comprising at least a database query at a first time when a database is in a first state, the database query having an associated query identifier (ID);
    analyzing the database query with the one or more processors to determine whether the database query has one or more corresponding physical resource requirements that fall within a historical top number of database queries in terms of usage of one or more pre-selected physical resources by checking a query cache storing queries above a pre-selected threshold of consumption of physical resource usage;
    storing at least the database query for later query tuning activity if the database query falls within the historical top number of database queries in terms of usage of one or more pre-selected physical resources;
    executing, with the one or more processors, the database query against the database in the first state;
    generating, with the one or more processors and asynchronously with respect to the executing of the database query, one or more query tuning recommendations for one or more stored database queries that fall within the historical top number of database queries in terms of consumption of physical resource usage;
    providing, via a user interface, threshold selectivity input data for tables to which the one or more query tuning recommendations have been generated;
    receiving, via the user interface, input to initiate creation of at least one custom index based on the one or more query tuning recommendations;
    executing, with the one or more processors, a subsequent database query modified according to at least one of the query tuning recommendations against the database.

2. The method of claim 1 wherein the database query physical resource requirements comprise at least query running time.

3. The method of claim 1 wherein the database query physical resource requirements comprise at least a number of buffer gets corresponding to the database query.

4. The method of claim 1 wherein the database query physical resource requirements comprise at least processor consumption corresponding to the database query.

5. The method of claim 1 wherein the database query physical resource requirements comprise at least a number of disk reads corresponding to the database query.

6. The method of claim 1 wherein the historical top range of database queries is based on a percentile of rating of one or more selected physical resource requirements.

7. The method of claim 1 wherein the historical top range of database queries is based on a numerical rating of one or more selected characteristics.

8. A non-transitory computer-readable medium having stored thereon instructions that, when executed by one or more processors, are configurable to cause the one or more processors to:
    receive, with a computing platform having one or more processors coupled with at least one physical memory device, a request comprising at least a database query at a first time when a database is in a first state, the database query having an associated query identifier (ID);
    analyze the database query with the one or more processors to determine whether the database query has one or more corresponding physical resource requirements that fall within a historical top number of database queries in terms of usage of one or more pre-selected physical resources by checking a query cache storing queries above a pre-selected threshold of consumption of physical resource usage;
    store at least the database query for later query tuning activity if the database query falls within the historical top number of database queries in terms of usage of one or more pre-selected physical resources;
    execute, with the one or more processors, the database query against the database in the first state;
    generate, with the one or more processors and asynchronously with respect to the executing of the database query, one or more query tuning recommendations for one or more stored database queries that fall within the historical top number of database queries in terms of consumption of physical resource usage;
    provide, via a user interface, threshold selectivity input data for tables to which the one or more query tuning recommendations have been generated;
    receive, via the user interface, input to initiate creation of at least one custom index based on the one or more query tuning recommendations;
    execute, with the one or more processors, a subsequent database query modified according to at least one of the query tuning recommendations against the database.

9. The non-transitory computer-readable medium of claim 8 wherein the database query physical resource requirements comprise at least query running time.

10. The non-transitory computer-readable medium of claim 8 wherein the database query physical resource requirements comprise at least a number of buffer gets corresponding to the database query.

11. The non-transitory computer-readable medium of claim 8 wherein the database query physical resource requirements comprise at least processor consumption corresponding to the database query.

12. The non-transitory computer-readable medium of claim 8 wherein the database query physical resource requirements comprise at least a number of disk reads corresponding to the database query.

13. The non-transitory computer-readable medium of claim 8 wherein the historical top range of database queries is based on a percentile of rating of one or more selected characteristics.

14. The non-transitory computer-readable medium of claim 8 wherein the historical top range of database queries is based on a numerical rating of one or more selected characteristics.

15. A system comprising:
at least one memory device;
one or more processors coupled with the at least one memory device, the one or more processors to execute code configurable to receive, with a computing platform having one or more processors coupled with at least one physical memory device, a request comprising at least a database query at a first time when a database is in a first state, the database query having an associated query identifier (ID), to analyze the database query with the one or more processors to determine whether the database query has one or more corresponding physical resource requirements that fall within a historical top number of database queries in terms of usage of one or more pre-selected physical resources by checking a query cache storing queries above a pre-selected threshold of consumption of physical resource usage, to store at least the database query for later query tuning activity if the database query falls within the historical top number of database queries in terms of usage of one or more pre-selected physical resources, to execute, with the one or more processors, the database query against the database in the first state, to generate, with the one or more processors and asynchronously with respect to the executing of the database query, one or more query tuning recommendations for one or more stored database queries that fall within the historical top number of database queries in terms of consumption of physical resource usage, to provide, via a user interface, threshold selectivity input data for tables to which the one or more query tuning recommendations have been generated, to receive, via the user interface, input to initiate creation of at least one custom index based on the one or more query tuning recommendations, to execute, with the one or more processors, a subsequent database query modified according to at least one of the query tuning recommendations against the database.

16. The system of claim 15 wherein the database query physical resource requirements comprise at least query running time.

17. The system of claim 15 wherein the database query physical resource requirements comprise at least a number of buffer gets corresponding to the database query.

18. The system of claim 15 wherein the database query physical resource requirements comprise at least processor consumption corresponding to the database query.

19. The system of claim 15 wherein the database query physical resource requirements comprise at least a number of disk reads corresponding to the database query.

20. The system of claim 15 wherein the historical top range of database queries is based on a percentile of rating of one or more selected characteristics.

* * * * *